(12) United States Patent
Zeigler

(10) Patent No.: US 6,199,900 B1
(45) Date of Patent: Mar. 13, 2001

(54) VEHICLE SAFETY COLLISION HEADREST SYSTEM

(76) Inventor: Gary D. Zeigler, 6631 Candlestick Ave. NE., Canton, OH (US) 44721

( * ) Notice: Subject to any disclaimer, the term of this patent is extended or adjusted under 35 U.S.C. 154(b) by 0 days.

(21) Appl. No.: 09/031,974

(22) Filed: Feb. 26, 1998

Related U.S. Application Data

(60) Provisional application No. 60/049,203, filed on Jun. 9, 1997.

(51) Int. Cl.[7] .................................................. B60R 21/32
(52) U.S. Cl. ........................ 280/735; 280/730.2; 701/49; 297/216.12
(58) Field of Search ............................... 280/735, 730.1, 280/730.2; 701/49, 45; 180/282, 274; 297/216.12

(56) References Cited

U.S. PATENT DOCUMENTS

| 3,397,911 |   | 8/1968  | Brosius, Sr. ........................ 297/216 |
| 3,510,150 | * | 5/1970  | Wilfert ............................... 280/730.1 |
| 3,586,366 |   | 6/1971  | Patrick ............................... 297/391 |
| 3,603,535 | * | 9/1971  | DePolo ............................... 244/121 |
| 3,663,035 | * | 5/1972  | Norton ............................... 280/734 |
| 3,779,577 | * | 12/1973 | Wilfert ............................... 280/730.1 |
| 5,110,185 |   | 5/1992  | Schmutz et al. ..................... 297/410 |
| 5,324,071 | * | 6/1994  | Gotomyo et al. ................. 280/730.1 |
| 5,330,255 |   | 7/1994  | Stawicki ............................. 297/391 |
| 5,466,001 |   | 11/1995 | Gotomyo et al. ................. 280/730.1 |
| 5,474,327 | * | 12/1995 | Schousek ............................ 280/735 |
| 5,484,189 |   | 1/1996  | Patterson ........................... 297/410 |
| 5,556,128 | * | 9/1996  | Sinnhuber et al. ............... 280/730.2 |
| 5,556,129 |   | 9/1996  | Coman et al. ..................... 280/730.2 |
| 5,694,320 | * | 12/1997 | Breed .................................. 701/45 |
| 5,738,407 | * | 4/1998  | Locke ............................... 297/216.12 |
| 5,803,485 | * | 9/1998  | Acker et al. ........................ 280/728.2 |
| 5,822,707 | * | 10/1998 | Breed et al. ........................... 701/49 |
| 5,833,312 | * | 11/1998 | Lenz .................................. 297/216.13 |
| 5,911,433 | * | 6/1999  | Swann ............................... 280/730.2 |
| 6,024,378 | * | 2/2000  | Fu ......................................... 701/49 |

FOREIGN PATENT DOCUMENTS

| 4218252A | * | 12/1992 | (DE) ................................. 280/730.1 |
| 291554A  | * | 11/1988 | (EP) .................................. 280/730.1 |

* cited by examiner

*Primary Examiner*—Michael Mar
*Assistant Examiner*—Lynda Jasmin
(74) *Attorney, Agent, or Firm*—Oldham & Oldham Co., L.P.A.

(57) ABSTRACT

A vehicle safety collision headrest system which substantially instantaneously moves a headrest of a seat from any manually adjusted position to a fully extended position. The system includes a pressure actuation assembly having combustible propellant or fluid tank fluidly connected to a cylinder. The cylinder is rigidly connected to a bottom of the headrest and upon the occurrence of a collision or abrupt stopping the pressure actuation system fires the cylinder upwardly which causes the headrest to extend to a properly adjusted position behind a passenger's head and neck. The pressure actuation system inflates a front airbag which extends between a bottom of the headrest and a top of the seat to fill the gap therebetween. The front airbag cushions the passenger's head and neck as the passenger is thrust rearward and protects the passenger's head and neck from contacting the cylinder and poles rigidly mounted to the bottom of the headrest. A rear airbag may be optionally provided to protect back seat passengers from contacting the rear of the front seat and its hardware as the back seat passenger is thrust forward. The safety collision headrest system can be installed in rear seats as well as in front seats.

25 Claims, 8 Drawing Sheets

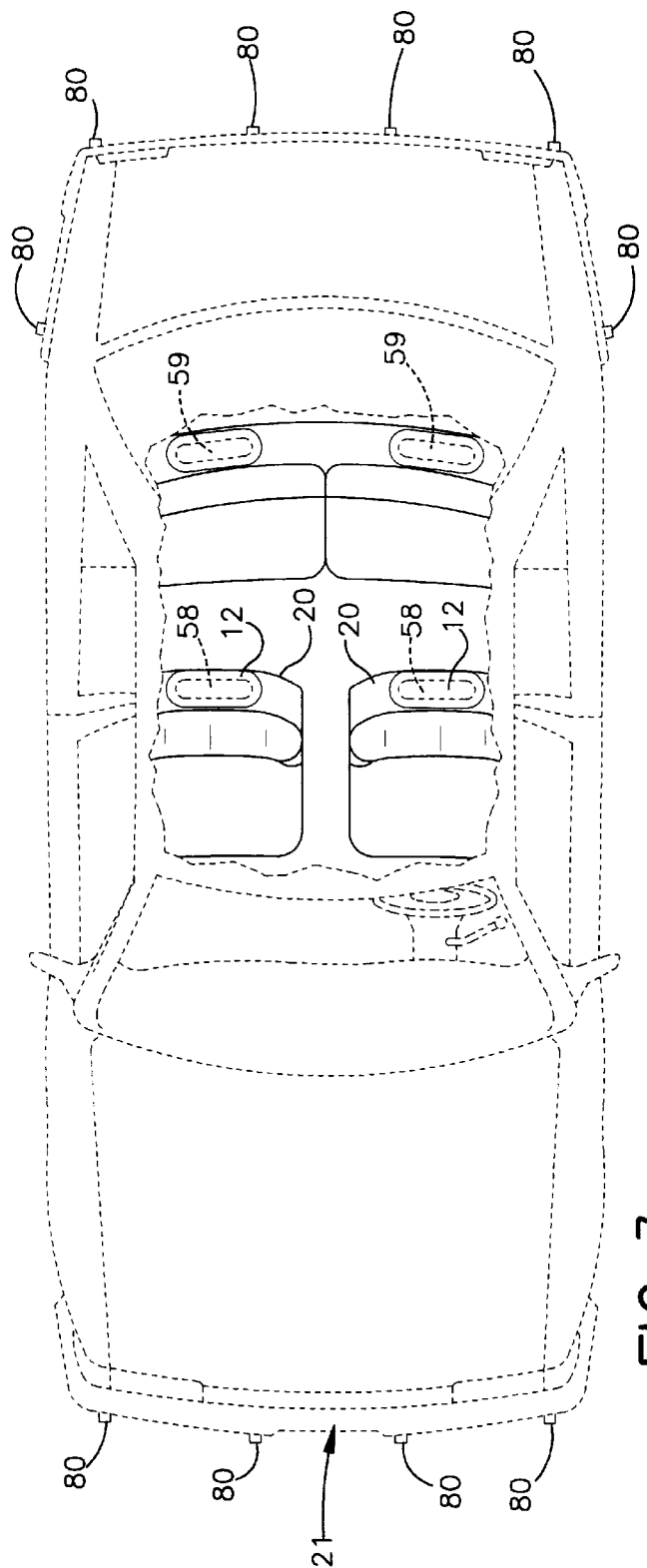
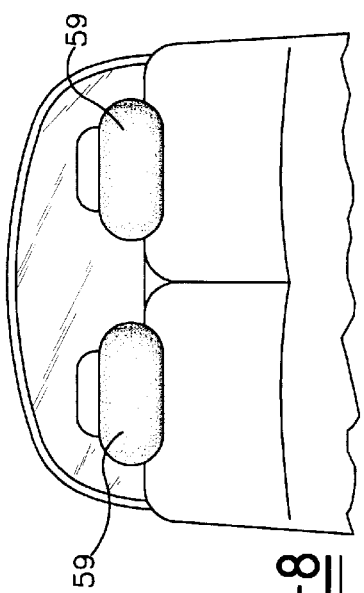
FIG.-7
FIG.-8

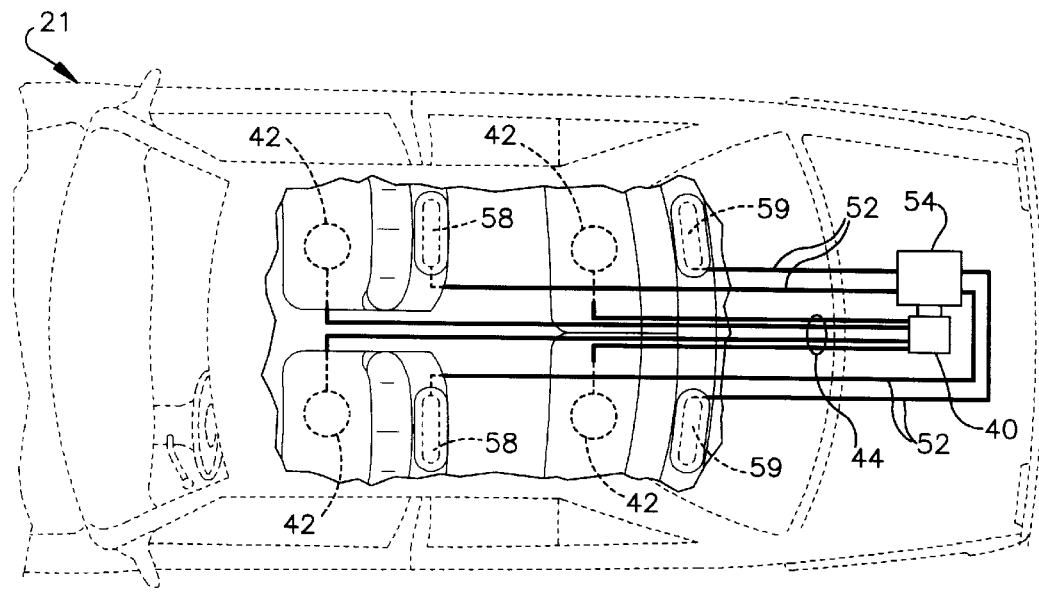
FIG.-14
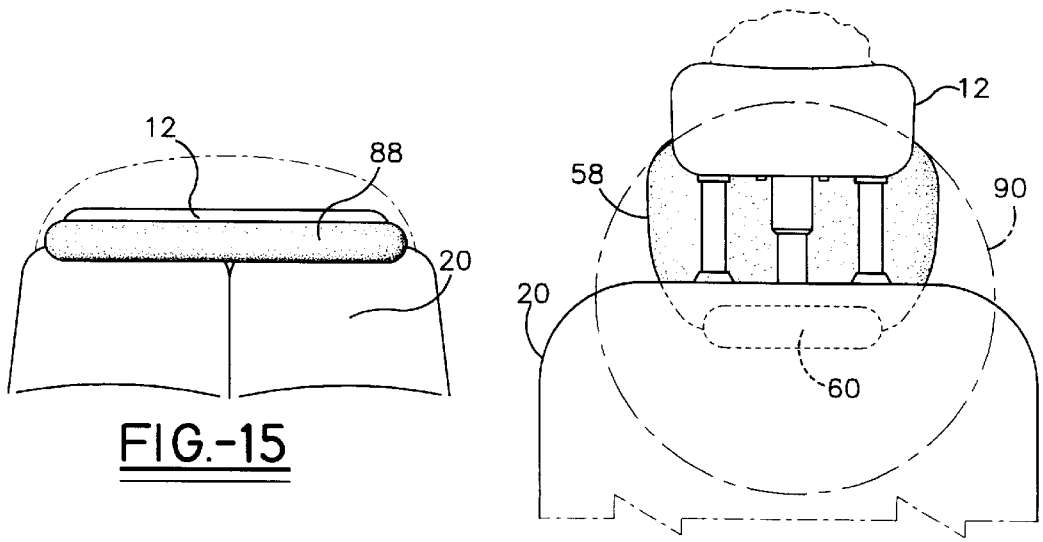
FIG.-15
FIG.-16

VEHICLE SAFETY COLLISION HEADREST SYSTEM

This application claim benefit to provisional application No. 60/049,203 Jun. 9, 1997.

TECHNICAL FIELD

The invention relates to headrests, and more particularly to a headrest system having the standard adjustment features that allow a headrest to be adjusted to the desired height of a driver or passenger, while further including a collision activated firing mechanism coupled with an airbag system which inflates between the headrest and the seat. Specifically, the invention is a safety collision headrest system that includes a collision activated actuation or firing mechanism for substantially instantaneously moving the headrest from any manually adjusted position to an upper position upon the occurrence of a collision or similar event, and an airbag which inflates to fill the gap formed between the headrest and seat when the headrest is moved to an upper position, whereby the combination of the headrest, actuation mechanism, and airbag provides for a safety system in which the head and neck of the driver or passenger seated in the front, middle or rear seat is protected from whiplash, neck, head or spinal related injury due to an improperly designed and/or positioned headrest. Additionally, the airbag or an additional airbag may inflate in the rear or middle of a front seat to further provide a back seat passenger airbag to protect back seat passengers from being injured upon the occurrence of a collision or similar event.

The safety collision headrest system may also include sensors in each seat thereby allowing the airbags to be selectively fired only when a passenger is in the specified seat and if that passenger is over a predetermined weight set point. The safety collision headrest system also improves driver visibility by allowing smaller headrests to be used since the airbags and not the headrest are being relied upon for protection of the passenger. This in turn improves overall safety for passengers of all types of vehicles, including, but not limited to automobiles, trucks, vans, sport utility vehicles and so on.

BACKGROUND INFORMATION

Personal injury claims from head and neck injuries due to automobile accidents and collisions amount to billions of dollars per year. For this reason, any system that would function to prohibit and/or reduce such injuries has been long sought after by the automobile, medical, and insurance industries.

For the better part of history, most automobile seats were bench-type seats which extended upward from the floor of the vehicle only to approximately the mid-section or upper section of an adult's back. This substantially vertical back portion of the seat provides support for the body of the passenger allowing the passenger to be seated in a relatively upright position. However, these standard bench seats do not provide support for the neck and head of the passenger.

One of the reasons that seats do not extend to the full sitting height of a passenger is that such a structure would obstruct the view of the driver during vehicle operation. In addition, seats extending to the fall sitting height can interfere with the driver hearing conversations within the vehicle causing the driver to strain or concentrate his or her attention elsewhere rather than on the road. Furthermore, each and every passenger is of a different sitting height. It would be very difficult to size and design a seat which comfortably and safely accommodates all potential passengers. The headrest system of the present invention substantially increases driver visibility by allowing smaller headrests to be used throughout the vehicle without sacrificing passenger safety.

In more recent years, headrests and particularly adjustable headrests have attempted to solve this problem of accommodating drivers and passengers (hereinafter collectively referred to as passengers) of different sizes. Basically, an adjustable headrest is a vertically adjustable padded body against which the passenger may rest his or her head. The padded body may be adjusted vertically upwardly from the top of the seat along one or two adjustment posts, supports or rods. In use, the specific passenger is required to move the headrest up or down to properly position the headrest behind his or her head.

Literally hundreds of prior art patents exist in this area of technology which, in theory, should substantially reduce the quantity of head and neck injuries. However, in reality, most passengers improperly position the headrest with reference to his or her individual body size or fail to adjust the headrest at all. Often, the headrest remains at its lowermost position against the top side of the seat. In some cases, to improve visibility, the headrest is removed from the vehicle altogether.

As a result, these headrests not only fail to prevent head and neck injuries, in many instances additional injuries have been incurred due to improperly positioned head rests. For instance, a headrest that is positioned too high will cause the passenger to not only miss the headrest when his or her neck is forced back towards the seat, but the passenger's head and neck will make contact with the rigid supports upon which the headrest is supported resulting in further injuries which would not have occurred had the headrest not been adjustable. Any contact with these rigid support structures, which are typically made out of metal or hard plastic, can cause significant injury to the head and/or neck, particularly when the head and/or neck makes contact with the support structures following an abrupt stop or a collision.

Clearly, the invention of the adjustable headrest is an advancement in the area of safety to the head and/or neck during the operation of or riding in an automobile, but this advancement is only applicable when the headrest is used properly. That is, the adjustable headrest is only effective when it is properly adjusted for each individual's height. Since such an adjustment is generally not properly done, further safety precautions are clearly needed.

Additionally, in certain vehicles individual or bucket seats have replaced the bench seat. These bucket seats often have a built-in headrest which is, in effect, an extension of the seat upward beyond the mid to upper section of the back. This extension acts to provide some head and neck support but a large percentage of visibility is lost due to the upward extension which creates a blind spot in relation to oncoming passing vehicles. In addition, these bucket seats are generally of a standard height such that very tall passengers are still at risk for head and/or neck injuries because height of the passenger exceeds that of the bucket seat. Furthermore, the general design of the bucket seat is such that the head and/or neck are generally several inches to a foot away from this upper part of the seat whereby a collision of the vehicle still causes rapid acceleration of the head and neck toward the seat. Due to this rapid acceleration and non-optimal design of the headrest portion of the bucket seat, injuries still occur.

Several headrest systems have been developed which attempt to properly position a passenger's headrest behind the passenger's neck or attempt to cushion the rearward thrusting of the passenger's head and neck. Examples of these prior art headrest systems include U.S. Pat. No. 3,397,991 which discloses an automobile safety device having a spring loaded headrest and a pendulum which senses a sudden stopping or collision of the vehicle. When the pendulum springs forward the springs are released to force the headrest upwardly.

U.S. Pat. No. 3,586,366 discloses a inertia-responsive retractable head restraint device which rotates to an erect and supportive position when the headrest senses a sudden stop or collision of the vehicle.

U.S. Pat. No. 3,779,577 discloses a safety installation for the passengers of vehicles especially passengers of motor vehicles. The headrests of the front seats includes front and rear airbags which inflate upon sudden stopping or collision of the vehicle. One airbag inflates towards the front seat passenger to cushion the rearward thrust of the front seat passenger and the other airbag inflates towards the back seat passenger to cushion the forward thrust of the back seat passenger.

U.S. Pat. No. 5,110,185 discloses a vehicle seat which provides rollover protection in convertible or removable roof vehicles. When a sensor senses a rollover condition, a coil spring is released which forces a headrest upwardly beyond the height of the passenger's head to prevent the passenger's head from striking the ground during rollover of the vehicle.

U.S. Pat. No. 5,330,355 discloses a seat integrated inflatable neck support having a generally U-shaped inflatable airbag. The airbag is selectively inflatable by the passenger and wraps around the passenger's head and neck to support the passenger 5 head and neck during transit.

U.S. Pat. No. 5,466,001 discloses an airbag system for an automobile vehicle which senses the presence of a front seat or back seat passenger and inflates the airbags accordingly upon a collision of the vehicle.

U.S. Pat. No. 5,484,189 discloses a retractable pop-up headrest usable with a vehicle passenger seat. A spring is attached to the headrest and upon rapid deceleration of the vehicle the spring is activated permitting the headrest to move upwardly towards an operative position.

U.S. Pat. No. 5,556,129 discloses a vehicle seat back which includes a head side impact air bag. The seat includes a tower extending upwardly from the seat back upper end which contains an inflatable air bag which is deployable to provide head and head/body side impact protection for a seat occupant.

Although these prior art headrest systems are adequate for the purpose for which they were intended, these headrest systems fail to move the headrests in the proper position in a quick enough manner. During collisions, a passenger's head and neck are thrust back in a fraction of a second. Spring loaded mechanisms fail to react in the split second between the time of impact and the backward thrusting of the passenger's head and neck. Further, the pendulum mechanism used on several of these headrest systems are unreliable and often malfunction. For these reasons the prior art cited fails to adequately protect passengers and increase vehicle safety both before and during an accident.

Additionally, many automobiles are manufactured with back seat headrests. Typically, these back seat headrests are not vertically adjustable because any upward movement of the back seat headrest would obstruct the view of the driver out the rear window of the vehicle. Instead of vertically adjustable headrests, manufacturers have been extending the height of fixed backseat headrests in an attempt to provide protection while maintaining some measure of visibility out of the rear window of the vehicle. The larger headrests have continued to decrease visibility without any measurable increase in safety being provided to backseat passengers. These unadjustable back seat headrests also fail to adequately protect medium tall to tall passengers because the headrests do not fully extend to an appropriate height to protect the head and neck of these taller passengers. The headrest system of the present invention substantially instantaneously moves the back seat headrest upwardly to the fully extended position to provide support to these back seat passengers upon the occurrence of a collision or abrupt stopping, thereby providing head and neck protection along with better driver visibility in general.

Finally, standard head rests are generally made of the same material as the seat which includes some type of cloth, padded foam, or other material which is relatively comfortable to rest one's body against while still providing substantial support and rigidity as is needed by the seat, During a collision or other similar abrupt stop, the passenger's head and/or neck will often impact the headrest at a high speed. This rigid properties of the headrest cause the headrest to function as a rather hard stop even though it is covered with a cloth or padded foam. It would obviously be preferable to provide a more cushioned stop for the head and/or neck during such a collision or abrupt stop while simultaneously providing sufficient support during standard seating.

SUMMARY OF THE INVENTION

It is an objective of the present invention to provide an improved headrest system capable of reducing or eliminating head and/or neck injuries.

It is a further objective of the present invention to provide an improved headrest system that functions as a safety collision headrest.

It is a further objective of the present invention to provide an improved headrest system that is actuatable to an upper position by various events including a collision or other abrupt or sudden stops.

It is a further objective of the present invention to provide an improved headrest system which after being actuatable to an upper position provides for inflation of an airbag which fills the gap formed between the extended headrest and the top of the seat.

It is a further objective of the present invention to provide an improved headrest system which provides airbag protection to all occupied seats of a vehicle including front, middle and back seats.

It is a further objective of one embodiment of the present invention to provide an improved headrest system which may be retrofitted to current car seats.

It is a further objective of one or more embodiments of the present invention to provide an improved headrest system in which an airbag is inflatable over a rear portion of a front seat so as to provide a protective airbag to back seat passengers.

It is a further objective of one embodiment of the present invention to provide an improved headrest system that selectively deploys airbags based on the selective presence of a passenger detected in a seat.

It is a further objective of the present invention to provide an improved headrest system that is cost efficient to install in a vehicle, making the vehicle more cost efficient to insure while improving overall passenger safety due to the system's simplicity and selective deployment of airbags.

It is a further objective of the present invention to provide an improved headrest system capable of selectively controlling individual airbags in a vehicle so each airbag can be made to deploy or prevented from deploying to protect children and infants in restraining car seats.

It is a further objective of the present invention to provide an improved headrest system which is of simple construction, which achieves the stated objectives in a simple, effective and inexpensive manner, and which solves problems and satisfies needs existing in the art.

These and other objectives and advantages are obtained by the safety collision headrest system of the present invention, the general nature of which may be stated as including a seat having a front, a rear and a top; a headrest removably attached to the seat and extendable to an uppermost position; pressure actuation means for moving the body to the uppermost position; and an airbag deployed upon occurrence of an event.

BRIEF DESCRIPTION OF THE DRAWINGS

The preferred embodiments of the invention, illustrative of the best mode in which Applicant has contemplated applying the principles, are set forth in the following description and are shown in the drawings and are particularly and distinctly pointed out and set forth in the appended claims.

FIG. 7 is a top plan view showing the location of the front and back seat airbags contained within the respective head rests and showing the position of the collisions sensors on the vehicle;

FIG. 8 is a front elevational view of the back seat airbags in the inflated position;

FIG. 14 is a top plan view showing the location of the controller for the headrest system including the pressurized fluid supply lines and tank for inflation of the front and back seat airbags and the sensors for detection of seat occupancy;

FIG. 15 is a front elevational view of a single elongated airbag in the inflated position used to protect all the occupants of a bench-type seat of a vehicle;

FIG. 16 is a rear elevational view showing the headrest in an extended position with the supplemental rear airbag deployed from within the top of the front seat as opposed to from within the headrest;

Similar numerals refer to similar parts throughout the drawings.

DETAILED DESCRIPTION OF THE PREFERRED EMBODIMENT

Figure 10:
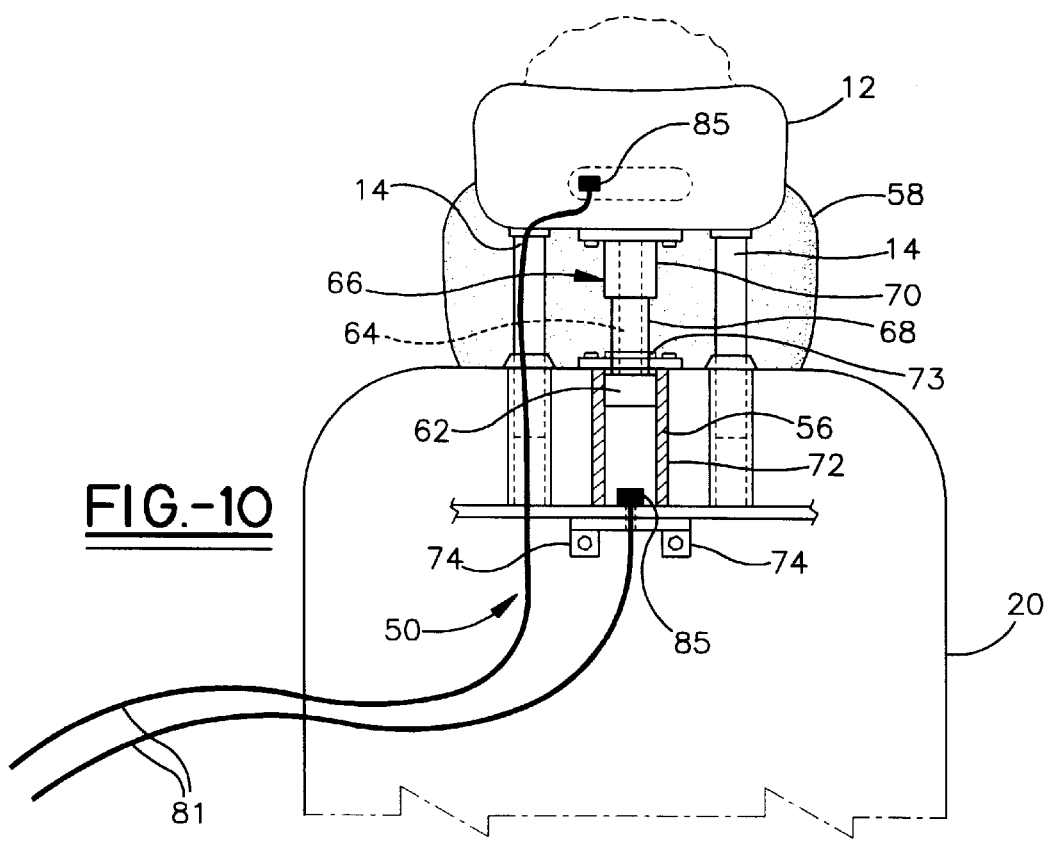
FIG. 10 is a rear elevational view in section of the headrest system shown in FIG. 2 with the optional or supplemental rear airbag removed to show the use of combustible propellants to raise the headrest and inflate the airbags.

Accordingly, the improved safety collision headrest system of the present invention is shown generally in FIGS. 1–6 and is indicated at 10. System 10 generally includes an occupant headrest 12 and a pressure actuation assembly 50 (FIG. 10). In the event of a collision, the present invention is intended to move the occupant headrest 12 to an upper or extended position and deploy one or more injury saving airbags.

Although headrest system 10 is shown in FIGS. 1–6 installed within a front seat for deployment of airbag 58, headrest system 10 could be installed within a back seat to protect back seat passengers in a similar manner. Airbag 59 is similar in structure and function to airbag 58 and provides a cushion for the back seat passenger's head and neck when the passenger is thrust rearwardly against the back seat. Other than possibly the shapes, all airbags described herein are constructed in a traditional manner from common materials known by those of ordinary skill in the airbag arts.

Figure 2:
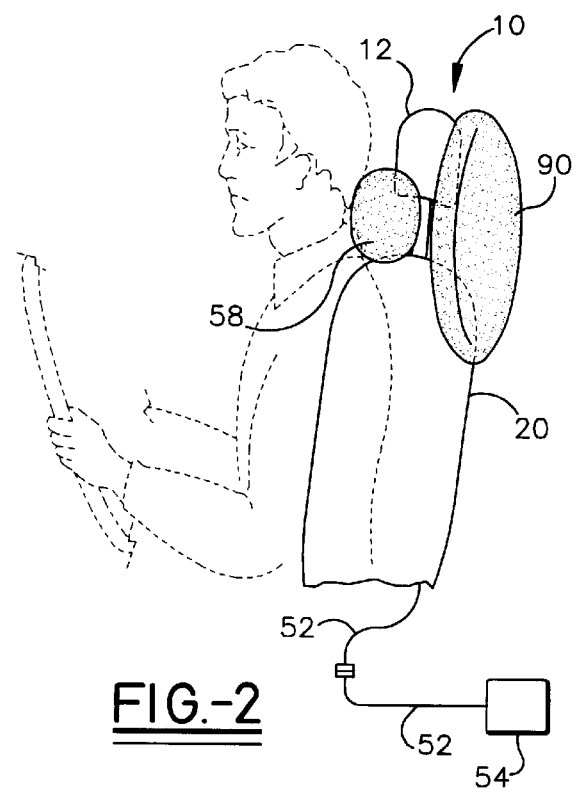
FIG. 2 is a side elevational view of the safety collision headrest system of FIG. 1 immediately after a collision or abrupt stop showing the headrest in an upper position and showing front and rear airbags inflated to fill the gap formed between the headrest and the seat to provide a cushion for the head and neck of both a front seat passenger, preventing the passenger's head and neck from making contact with the rigid support structures, and a back seat passenger, preventing the back seat passengers head from contacting the rear of the seat or rigid support structures.

FIG. 2 illustrates that, when inflated, front airbag 58 fills the gap formed between headrest 12 and the top of seat 20 at the front of seat 20. Inflated airbag 58 is positioned in front of poles 14 and piston rod 64 between headrest 12 and the passenger to cushion the backward thrust of the passenger's head and neck upon a collision or abrupt stopping. Further, inflated front airbag 58 protects the passengers head and neck from contacting rigidly mounted poles 14 and sleeve 66 as the passenger is thrust backwards against seat 20.

Figure 9:
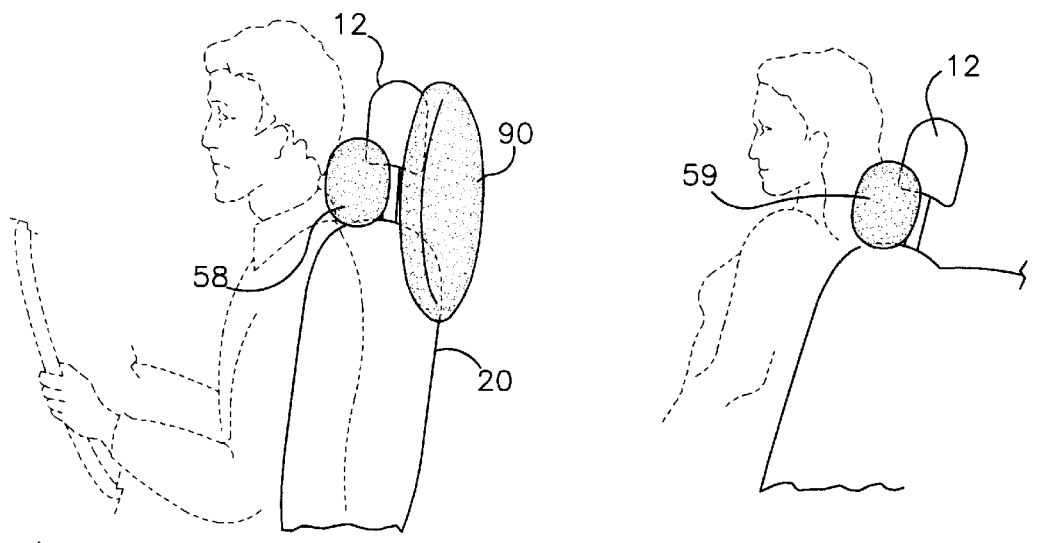
FIG. 9 is a side elevational view of front and back seat passengers sitting within the vehicle showing the airbags in the inflated position.

An optional rear airbag 90 (FIGS. 2, 5 and 6) may be positioned within airbag chamber 60, or within a separate airbag chamber, and is deployed in a manner similar to airbags 58 and 59, as will be explained later herein. Rear airbag 90 inflates toward the rear of seat 20, at substantially the same time front airbag 58 inflates, to fill the gap formed between headrest 12 and the top of seat 20. Airbag 90 is positioned between the back of headrest 12 and seat 20 on one hand and the back seat passenger to cushion the forward thrust of the back seat passenger (FIG. 9) into the rear of front seat 20. Further, inflated rear airbag 90 protects the back seat passenger's head, face and neck from contacting the rigid hardware of headrest 12 such as the head mounted poles 14 and piston 62 (FIG. 4) as the passenger is thrust forward toward the rear of front seat 20. Front and rear airbags 58 and 90, respectively, are connected to headrest 12 within common or separate chambers 60 in such a manner which directs the airbags to their respective positions as shown in FIG. 2 and prevents the airbags from expanding in an undesired off-centered position. It is to be appreciated that airbag 90 could serve alone in certain embodiments without front airbag 58.

Figure 1:
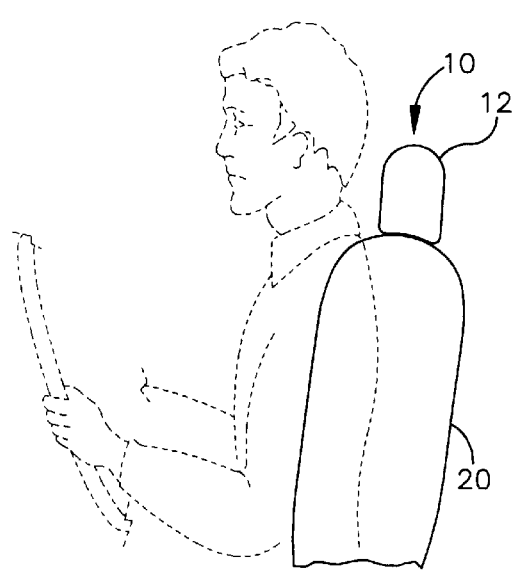
FIG. 1 is a side elevational view of the safety collision headrest system of the present invention showing the headrest properly positioned in a passenger-specific adjusted position behind the lower portion of the head and adjacent the neck.

Headrest 12, as described herein generally resembles those currently in use in passenger vehicles and includes one or more adjustment poles 14 rigidly attached thereto and extending outwardly from a bottom surface 16 of headrest 12. Headrest 12 is attachable to and extendable from the backrest of a seat 20 in a vehicle 21 (FIG. 7) as is shown in the figures. Seat 20 is typically formed with one or more pole receiving holes 22 (FIG. 4) along its upper surface. The number of pole receiving holes corresponds to the number of steel adjustment poles 14 of headrest 12. Holes 22 are formed substantially vertically downward into the backrest thereby providing a cylindrical or similarly shaped chamber in which the entire pole 14 may extend when headrest 12 is in a fully retracted position (FIG. 1).

Each pole receiving hole 22 is formed with an entrance opening 24 formed in the top surface of seat or backrest 20. A stop plate 26 is positioned at the base of each pole 14 which functions to prohibit further outward movement of headrest 12 when stop plates 26 move adjacent entrance openings 24. Entrance openings 24 are of a smaller diameter than stop plates 26 thus defining a collar or stop which limits the upward movement of headrest 12 and prevents poles 14 from sliding out of engagement with their respective holes 22. As is well known in the art, stop plates 26 may be of any configuration so as to serve the requirement that the headrest have a defined outer and uppermost point where it may extend no further from the seat. Headrest 12 is extendable from a retracted or seated position against the top of seat or seat backrest 20 (FIG. 1) to a fully extended position (FIG. 4) or to any position therebetween. The passenger may manually adjust headrest 12 by merely pulling headrest 12 upwardly or pushing headrest 12 downwardly to place headrest 12 in an optimal safety position.

In a preferred embodiment, airbags 58 of the present invention are located in the front seats of vehicle 21 and optionally in the back seats (FIG. 7). One or more airbag chambers 60 (FIGS. 3 and 4) formed within headrest 12 each store a respective airbag 58. A pressure actuation assembly, generally 50 (FIG. 10), is intended to quickly move headrest 12 to an extended position in the event of a collision and includes a compression cylinder 56 of any type such as pneumatic or hydraulic, and includes an extendable piston 62. Piston 62 is rigidly attached to headrest 12 spaced from and parallel to adjustment poles 14. In a preferred embodiment shown in FIG. 4, headrest 12 includes a pair of spaced and parallel adjustment poles 14 with piston 62 of compression cylinder 56 being positioned therebetween.

Fluidly expanding combustible propellant provides a pressurized fluid to cylinder 56 causing piston 62 to "fire" to its extended position upon actuation. Pressure actuation assembly 50, detailed in FIGS. 10 and 12, includes fluidly expanding combustible propellant in combination with charge 85, a compression cylinder 56, and one or more airbags 58. Thus, it is recommended that the outermost point defined by stops 26 be defined such that when compression cylinder 56 is fired, as described below, the pressure from cylinder 56 pushes headrest 12 to the predefined outer point.

Most vehicles today employ a combustible propellant such as sodium oxide to inflate currently used front airbags. A predetermined amount of sodium oxide is operatively coupled to a charge or blasting cap which in turn is connected to a collision sensor within the vehicle. Upon the occurrence of a collision, the sensor triggers the charge or blasting cap causing the sodium oxide to explode. The explosion causes the sodium oxide to expand rapidly in a gaseous state thereby inflating the airbag. The advantage to using an electrically triggered combustible propellant is that electrical signals travel very quickly allowing a faster and safer reaction time by the airbags.

Figure 12:
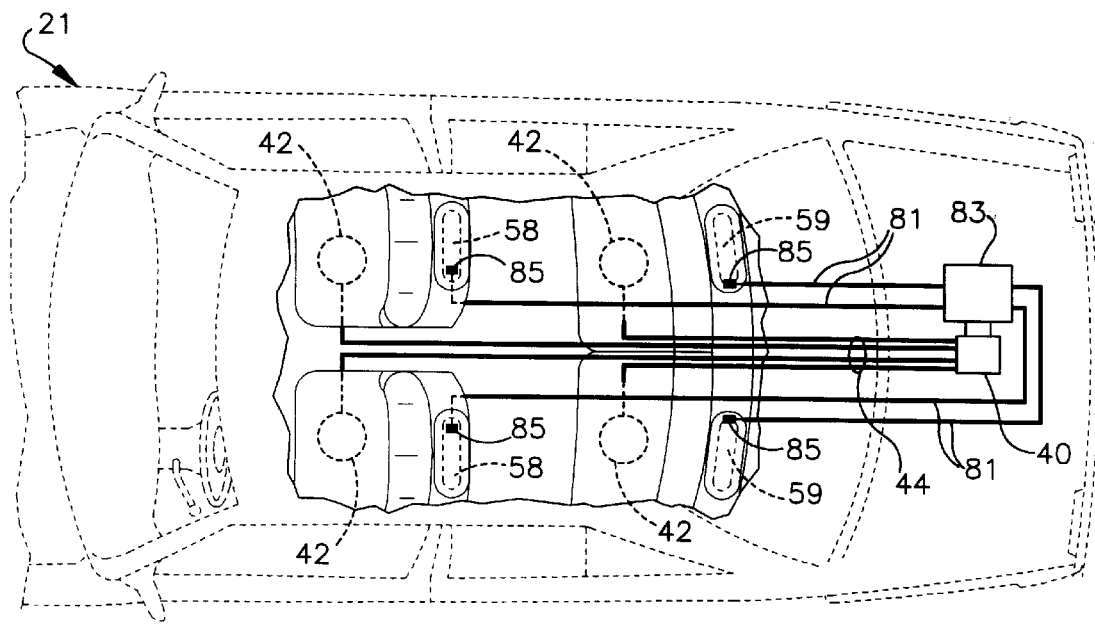
FIG. 12 is a top plan view showing the location of the controller for the headrest system including the electrical conductors and combustible propellant charges of the front and back seat airbags and the sensors for detection of seat occupancy.

As shown in FIGS. 10 and 12 in the preferred embodiment, a combustible propellant is used as the pressure actuation mechanism for raising the headrest to an upper position and/or inflating the airbags. In FIG. 10 a charge or blasting cap 85 is matched with a predetermined amount of combustible propellant and then operatively coupled with an airbag in chamber 60 of headrest 12. Another charge/propellant combination is operatively coupled with piston 62. Both charges 85 are coupled to electrical conductors 81 which transmit the electrical signals used to ignite charges 85. The combustible propellant (for example sodium oxide) when ignited by charge 85 create a rapidly expanding gas or fluid. Because electrical conductors 81 are relatively small and malleable, they can be run within the back of seat 20 and through poles 14 which protects conductors 81 from tampering and maintains an aesthetically pleasing environment within the vehicle.

Sodium oxide is a currently preferred propellant because it is a solid substance making it easy to handle, package and operatively mount within headrest 12 and seat back 20. Combustion converts the sodium oxide into a gas which expands more than twice as fast as compressed air. However, it is to be appreciated that Applicant contemplates the use of other propellants in varying states, such as gases, liquids or solids.

FIG. 12 shows connection of airbags 58 and 59 to charges 85 which are in turn connected to electrical interface 83 and controller 40. Controller 40 instructs electrical interface 83 to provide the appropriate deployment signal to each of the various airbags and headrest pistons. For instance, headrest pistons require deployment which is a fraction of a second prior to deployment of the airbags so that the headrest can be moved to its upper position, thereby creating room for the airbag. However, it should also be noted that headrest 12 and piston 62 could be operatively configured so both are activated from a single source of combustible propellant. Further, in alternative embodiments charges 85 may be directly coupled to the various collision sensors to directly deploy the airbags and raise the headrests without the assistance of a separate controller.

The preferred actuation assembly filly illustrated in FIG. 10 will now be described in more detail. Piston 62 includes a single piston and piston rod 64 which when fired extends outwardly from cylinder 56 to thrust headrest 12 upwardly to the predefined upper position. In the preferred embodiment, piston rod 64 is enclosed within a piston sleeve 66. Piston sleeve 66 includes an inner portion 68 engaged by an outer portion 70. Outer portion 70 slides over and along inner portion 68 when piston 62 moves to the extended position. A piston chamber 72 is formed in seat 20 for receiving cylinder 56, and inner and outer portions 68 and 70, respectively, of sleeve 66. Chamber 72 must have a diameter large enough to receive cylinder 56 and outer portion 70 of sleeve 66 when headrest 12 is in the downward most position. A collar 73 extends around the opening of chamber 72 to guide sleeve 66 and piston rod 64 extending therein.

Compression cylinder 56 is rigidly attached to the inner frame of seat 20 by a pair of brackets 74 (FIG. 10) which bolt or otherwise attach to cylinder 56 and the frame of seat 20. Alternatively, a bracket 76 (FIG. 13) may be mounted to a top of the frame of seat 20 to affix cylinder 56 to the seat frame. It is understood that cylinder 56 may be of various types of actuator mechanisms having one part rigidly mounted to the seat frame and a second part which is movable under a supply of combustible propellant or pressurized fluid.

Compression cylinder 56 is fluidly connected to a combustible propellant coupled with a charges 85 which detonates to cause the combustible propellant to explode. The fluid rapidly expands and exerts pressure on cylinder 56. Compression cylinder 56 could also be configured so that it is fluidly connected via fluid line 52 to a pressurized fluid tank. This tank may be a $CO_2$ cartridge as will be detailed later herein or any similar device capable of supplying pressurized fluid to cylinder 56.

One or more collision sensors 80 (FIG. 7) are located throughout vehicle 21 which sense collisions or abrupt and sudden stopping and which activate pressure actuation system 50. These sensors may be adjustable or may be of varying sensitivity to correspond to collisions at different locations on vehicle 21. When the sensors as indicated above, sense a collision or other potentially injurious event, charges 85 are detonated causing the combustible propellant to rapidly expand whereby compression cylinder 56 fires piston 62 to the fully extended safety position of FIGS. 2 and 4–6. Because headrest 12 is attached to the free end of piston 62 (the other end being rigidly affixed within the back of seat 20), the firing or extension of piston rod 64 moves headrest 12 to its upper position.

Collision sensors 80 could be one or more of any number of different types of sensors capable of detecting a collision of a vehicle. The actual number and positioning of such sensors within a vehicle can also vary widely depending on the type of sensors actually used. Collision and/or impact sensors are found throughout the prior art and Applicant's invention is not intended to be limited by the disclosures provided herein.

In further accordance with one of the other features of the invention, simultaneous or substantially simultaneously with the expansion of the compression cylinder 56 is the inflation of front airbag 58, and optionally rear bag 90. Pressurized fluid from the combustible propellant fills airbags 58 and/or 90 expanding and inflating the airbags. Airbags 59 may be operated in a manner substantially identified to that used in conjunction with airbag 58.

One advantage of safety collision headrest system 10 is the split-second timing from the occurrence of a collision or similar event to the upward movement of headrest 12 to its upper position, and the inflation of airbags 58, 59 and 90. Collision sensors 80 (FIG. 7) sense a collision and generate a signal which is transferred to controller 40. Collision sensors 80 (FIG. 7) and combustible propellant charges 85 are both electrically coupled to controller 40, shown in FIG. 12, which typically is a microprocessor capable of substantially real time monitoring and operating of a number of systems within vehicle 21. Controller 40 is used to process the information received from sensors 80 and as required coordinate deployment of headrest assemblies 10 located within the vehicle.

Controller 40 can be a separate device installed in vehicle 21 if headrest system 10 is retrofit as an aftermarket component for the vehicle or controller 40 could simply be an extension of an already existing control system when headrest system 10 is installed during production of vehicle 21. Most vehicles today include computer control systems which monitor and direct engine functions, electrical systems and numerous other systems. It may also be advantageous to keep controller 40 independent from other computer control systems in a vehicle thereby allowing controller 40 to only control and monitor headrest system 10. Controller 40 could also be configured to work in tandem with preexisting vehicle control systems thereby creating redundant control ensuring that a technical problem with one controller doesn't prevent the headrest system from operating during an emergency.

One feature made possible by controller 40 is the selective activation and deactivation of various airbags within vehicle 21. Referring to FIG. 12, controller 40 is shown coupled to electrical interface 83 and passenger detection sensors 42. A passenger detection sensor 42 is a weight actuated sensor located within each of the front and back seats of vehicle 21 and is designed to sense when and if a person is occupying the seat. Seat occupancy information is provided to controller 40 through coupling wires 44 which are run below the floor or carpeting of vehicle 21 for aesthetic purposes. By knowing which seats in vehicle 21 are occupied when a collision occurs, controller 40 can selectively actuate only the needed airbags, thereby saving the cost associated with reinstalling and charging the airbags afterwards. The costs associated with reassembling airbags is quite considerable and typically born by insurance companies. By only activating the airbags as needed, insurance companies will pay less on accident claims which in turn should lower driving insurance rates for vehicle owners. This type of selective actuation is especially needed for the headrest system of the present invention because it can double or triple the number of airbags in the vehicle.

When headrest system 10 is installed in a vehicle during its production the front dashboard airbags can also be incorporated into and operated by controller 40 thereby providing complete and efficient deployment of the various airbags depending on the current circumstances. As an example, if the vehicle is only occupied by the driver then during a collision only the front driver side dashboard airbag and front airbag 58 on the drivers side need to be activated. If a person is in the back seat on the passengers side but the front seat on the passengers side is empty then only front airbag 59 and rear airbag 90 on the passengers side need to be activated for the occupant of the back seat.

Another feature made possible by controller 40 in association with passenger detection sensors 42 is detection of children or other individuals whose body size and weight are too small to endure the force with which airbags are expelled when activated. One recurring problem now that airbags have become standard equipment on most automobiles is that children are being injured and killed by the force with which the airbag inflates. To overcome this problem, passenger detection sensors 42 are designed to not only detect whether the seat is occupied but also the amount of weight occupying the seat. By comparing the weight occupying the seat with one or more predetermined set points, controller 40 can determine whether or not to activate the airbags associated with a specific seat, thereby preventing injury due to high velocity actuation of the airbags. While not shown, controller 40 can also be configured to receive commands from the occupants of the vehicle through switches and/or other input devices mounted within the dash of the vehicle. A driver could disable the airbags associated with a particular seat if a small child or a children's car seat is occupying the seat. Selected airbags could also be disabled if a heavy, non-human object is placed within a seat. Because the object does not need to be protected, the airbag can be disabled thereby saving replacement costs if a collision occurs.

Controller 40 may optionally include a safety panel readout installed within the dashboard. Although not shown, the safety panel readout would be installed so as to be visible to the driver enabling him or her to easily determine which airbags are enabled or disabled and whether or not the system as a whole is functioning properly. Through the safety panel readout, controller 40 can alert the driver of any malfunctions of the safety collision system by performing self diagnostic checks. This allows the driver to detect and have problems serviced before the system is needed in a collision. The safety panel readout would be comprised of one or more standard electronic display devices such as indicator lights, digital display panels and/or audible alarms or signals.

After the activation of cylinder 56 and airbags 58, 59 and 90 when vehicle 21 has come to a stop, a release valve (not shown) of some type is actuated to release the pressure within cylinder 56 allowing headrest 12 to be pushed down to a normal operative position and/or allowing airbags 58 to deflate, if required. Alternatively, headrest 12 may be detachable allowing the repair shop to merely remove headrest 12, replace headrest 12 with a new headrest, complete with an undeployed air bag assembly.

Figure 11:
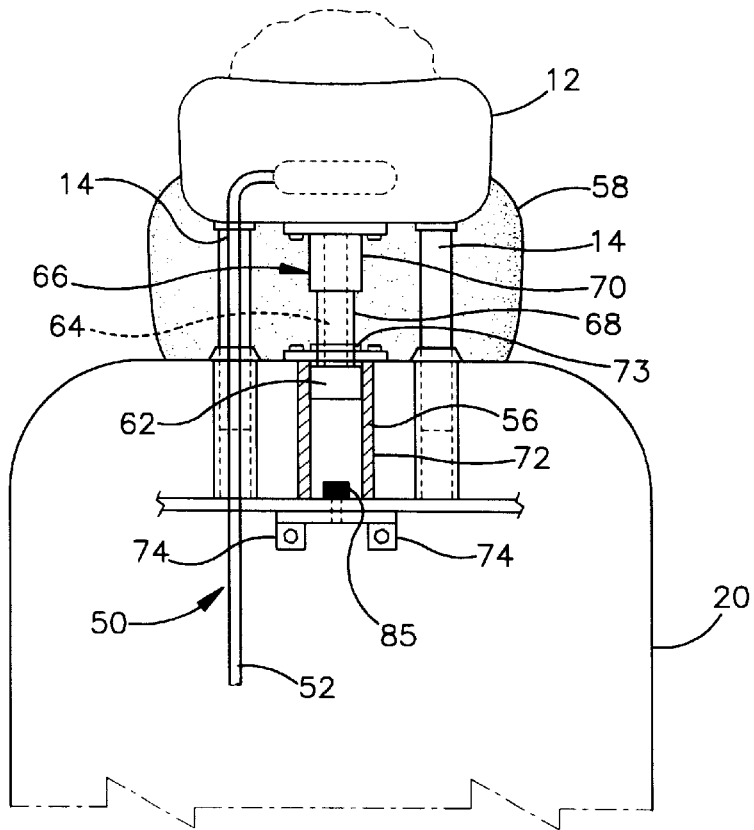
FIG. 11 is a rear elevational view in section of the headrest system shown in FIG. 2 with the optional or supplemental rear airbag removed to show the use of pressurized fluid to raise the headrest and inflate the airbags.

As illustrated in FIGS. 2, 11 and 14, alternate pressure actuation assemblies 50 may be used. One such embodiment is comprised of at least one fluid line 52, and a centralized pressurized fluid container or tank 54 which contains a pressurized supply of fluid such as $CO_2$. Tank 54 provides a supply of pressurized fluid through fluid line 52 to cylinders 56 and/or airbags 58 and 59. Fluid lines 52 (FIGS. 2, 11 and 14) which extend from tank 54 to airbags 58, 59 and 90 extend from the bottom of seat 20 upwardly through the inside of seat 20 and within sleeve 66 or poles 17 protecting the air lines from possible damage and hiding the airlines to provide an attractive hidden safety collision headrest system. In response to a signal generated by sensors 80 (FIG. 7) and within a fraction of a second after impact, pressurized fluid from tank 54 pushes cylinder 56 against headrest 12 forcing it to the predetermined upper point and inflates airbags 58 and 59 rapidly deploying them before the front and/or rear seat passenger is thrust rearwardly into seat 20 and headrest 12. In certain embodiments airbag 90 is deployed in a manner similar to airbags 58 and 59 to prevent injury to the rear seat passenger as the passenger is thrust forward toward the rear of front seat 20. FIG. 14 shows the embodiment in which pressurized fluid tank 54 is coupled to controller 40. While Applicant contemplates the use of controller 40 in implementing the safety collision headrest system 10 of the present invention, collision sensors 80 (FIG. 7) could be directly coupled to combustible propellant charges 85 or pressurized fluid tank 54 in such a manner that collision sensors 80 directly trigger inflation of airbags 58, 59 and/or 90 without any intermediary signal manipulation. In this embodiment controller 40 is also coupled to passenger detection sensors 42. Headrest system 10 is greatly simplified without controller 40 but several advantageous features can be implemented if controller 40 is included.

Figure 13:
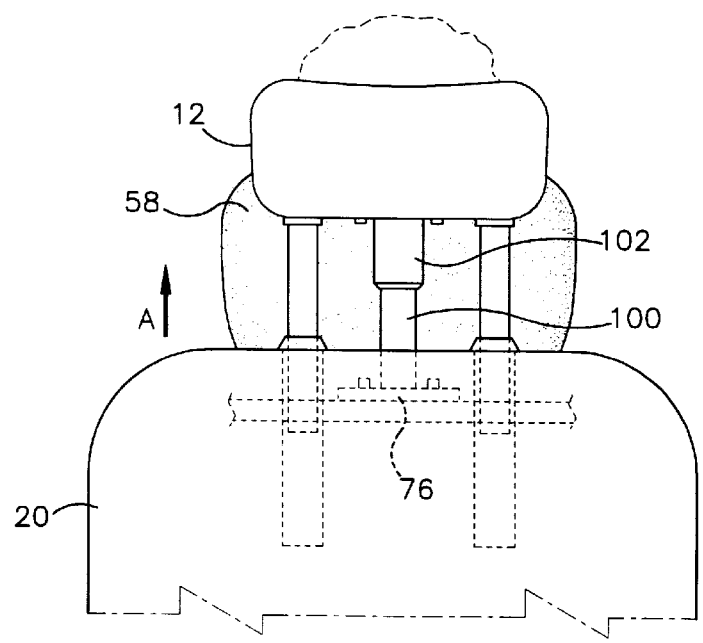
FIG. 13 is a rear elevational view in section similar to FIG. 10 showing a second embodiment of the cylinder mounted to the frame of the front seat.

Yet another embodiment for a pressure actuation method is shown in FIG. 13 wherein headrest system 10 could include a pressurized canister 100 screwed or otherwise attached to the frame of seat 20. A piston 102 has a diameter slightly larger than canister 100 and is sealed therewith. When a collision is detected, canister 100 releases pressurized fluid forcing air upward in the direction of arrow A which, in turn, forces piston 102 upwardly. The top of piston 102 is attached to headrest 12 and forces headrest 12 to its predetermined outermost position. Canister 100 may be unscrewed from seat 20 and replaced with a new canister. Canister 100 could either contain a combustible propellant such as sodium oxide in combination with a charge 85 to detonate the combustible propellant or fluid under pressure such as $CO^2$.

Figure 3:
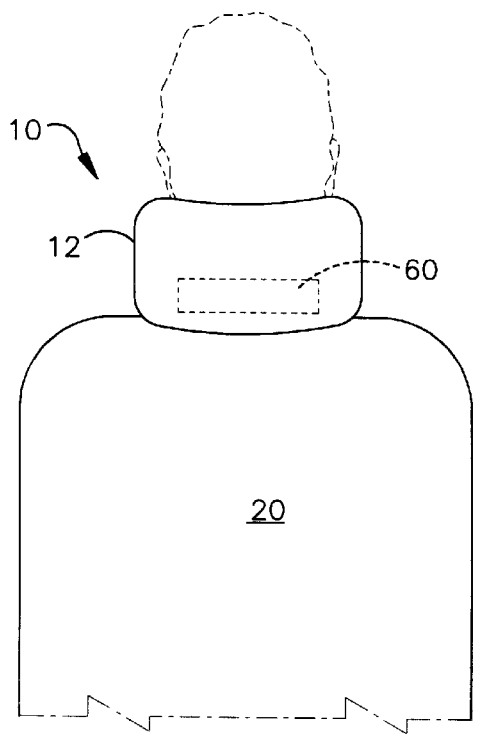
FIG. 3 is a rear elevational view of the headrest system of FIG. 1.
Figure 4:
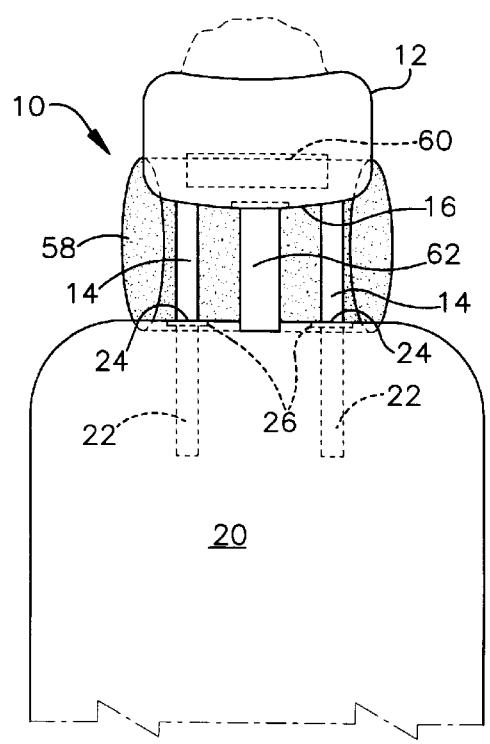
FIG. 4 is a rear elevational view of the headrest system shown in FIG. 2 with the optional or supplemental rear airbag removed for clearly showing the front airbag in the inflated position, the compression cylinder as well as the rigid support structures of the headrest.
Figure 5:
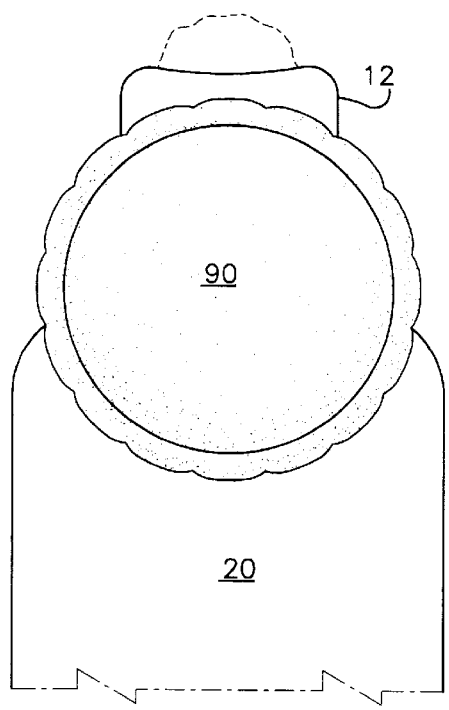
FIG. 5 is a rear elevational view of the headrest system shown in FIG. 2 with the rear airbag inflated behind the front seat.
Figure 6:
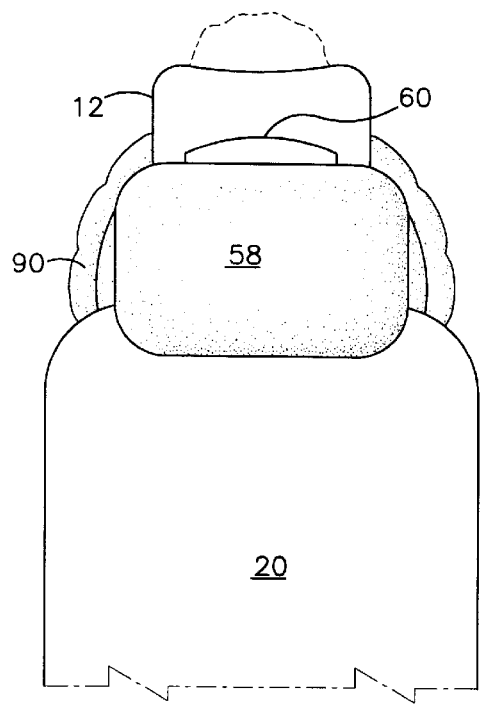
FIG. 6 is a front elevational view of the inflated headrest shown in FIG. 2.
Figure 19:
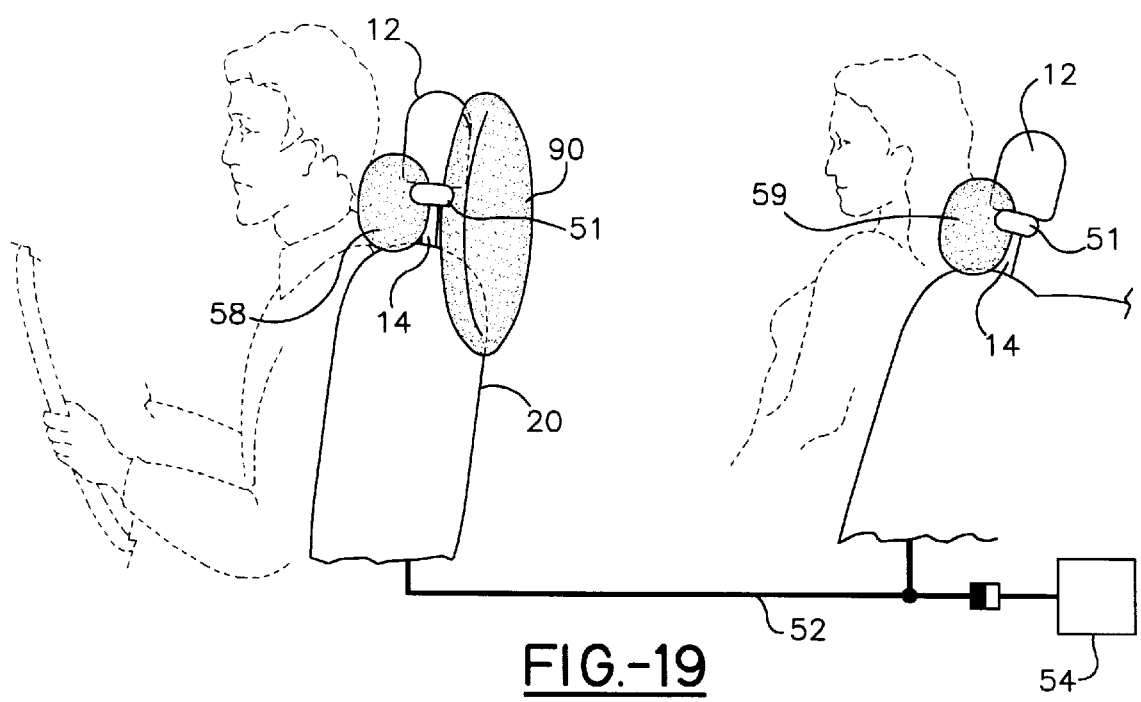
FIG. 19 is a side elevational view of front and back seat passengers sitting within the vehicle showing an alternative means for raising the headrest in which inflation of the airbags performs the headrest raising function.
Figure 22:
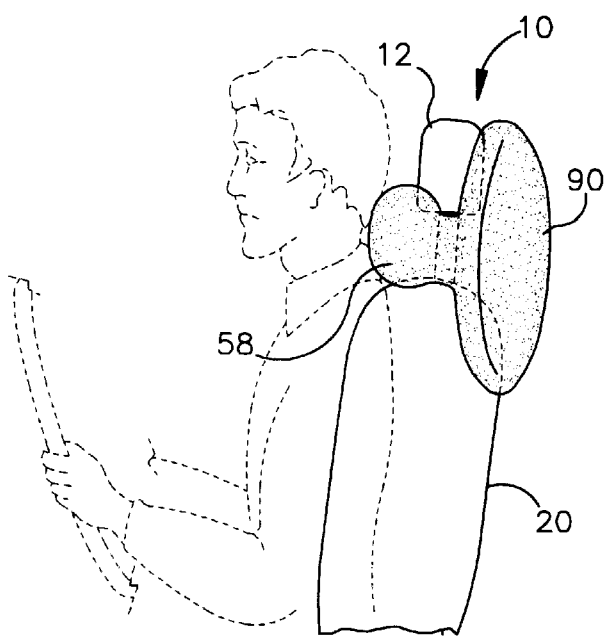
FIG. 22 is a side elevational view of the safety collision headrest system of FIG. 1 immediately after a collision or abrupt stop showing front and rear airbags configured from a single airbag structure.

The embodiment shown in FIG. 19, eliminates the use of a separate pressure actuation assembly 50 but instead relies on the expansion of the airbag(s) to extend the headrest 12 to its upper position. Airbags 58, 59 and/or 90 are stored in airbag chambers 60, as shown in FIGS. 3 and 4, but include an alignment ring 51 which is slidable along adjustment pole 14. Fluidly expanding combustible propellants, as previously described in detail herein, provide pressured fluid to airbags 58, 59 and/or 90 upon selective deployment causing the airbags to "fire" to their inflated position. The airbags deploy in the space between the top of backrest of seat 20 and headrest 12 thereby moving one or more alignment rings 51 against the bottom of headrests 12 forcing headrest 12 to an upper position, while inflating to protect the occupant/passenger against injury. Further, airbag 58 and airbag 90 could also be formed from a single airbag structure, such as shown in FIG. 22 and in this embodiment as well the airbag itself is used as the primary or sole means of moving the headrest to an upper position.

While the applicant has described several different pressure actuation mechanisms for movement of headrest 12 to an extended upper position, the invention should not be so limited, understanding that other actuating means could also be used including mechanical arrangements such as tensioned springs. Applicant does not consider the invention as limited to fluid operated devices. Any of the above means is intended for use in the movement of headrest 12 into an upper or extended position and used cooperatively with or exclusive of any mechanism chosen for the inflation of airbags 58, 59 and/or 90. As shown in the various figures, airbags 58 and 59 are preferably a rectangular shape and extend slightly beyond the sides of seat 20. Airbags 58 and 59 have a height slightly larger than the gap formed between the bottom of headrest 12 and the top of seat 20 when headrest 12 has been forced to its predetermined outermost position. The airbag(s) overlap headrest 12 and seat 20 to assure the entire gap is filled. Rear airbag 90 is generally preferred to be circular and is substantially larger than the gap formed between headrest 12 and seat 20 when headrest 12 is in the predetermined upper position. Larger airbag 90 gives a greater surface area or target to cushion the back seat passenger. Because the back seat passenger has a greater distance to travel from a normal sitting position to the rear of front seat 20, and because back seat passengers rarely wear their seat belts, it is unlikely that the back seat passengers will be thrust directly forward in-line with the rear of front seat 20. The larger surface area of rear airbag 90 increases the likelihood that the back seat passenger will contact the airbag rather than the hard rigid seat. It should be appreciated that this disclosure is not limited to the shape of either airbag 58, 59 or 90.

Figure 17:
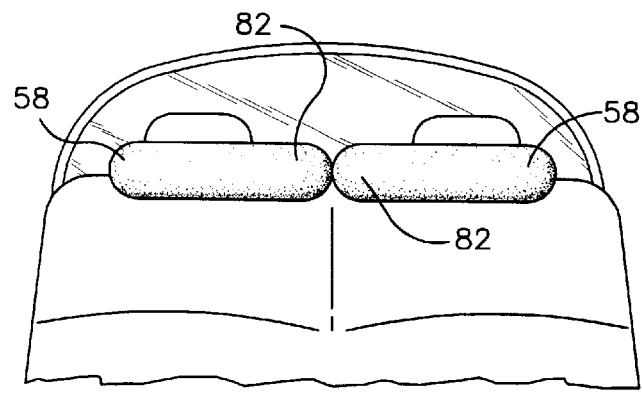
FIG. 17 is a front elevational view showing an alternate embodiment of airbags in the inflated position used to protect occupants of a bench-type seat of a vehicle.

FIG. 17 shows alternate airbags 58 in which each of the right and left front seat airbags 58 include inwardly extending narrow extensions 82 which are intended to cover the middle area between headrests 12 in a bench-type seat. Bench-type seats typically do not have middle headrests for middle front seat passengers thus exposing the middle front seat passengers to a greater degree of injury. The extensions 82 of each airbag 58 fill a portion of the middle area of the front seat intending to provide cushioned support for the middle front seat passenger.

FIG. 15 shows a front or rear seat airbag 88 inflating upwardly from a single bench-type front seat to fill the gap between headrest 12 and the top of seat 20. In this embodiment, airbag 88 is contained within a chamber in the top of front seat 20 which is loosely sealed using a fastener such as a hook and pile material (one type of such a material being sold under the trademark VELCRO). The same configuration, shown in FIG. 16, can be used for individual front seat airbags 58 enabling them to inflate upwardly from a single front seat 20 to fill the gap between headrest 12 and the top of seat 20. Upon inflation of front seat airbag 58, the airbags expand against the loosely sealed top of seat 20 forcing the airbag upwardly between the seat and the headrest. Airbag 58 could be one elongated airbag having enlarged outer sections to fill the gap between seat 20 and headrest 12 and a narrower middle section which functions as a headrest for a middle front seat passenger to cushion the middle front seat passenger's head and neck. The elongated airbag which extends across the middle portion of the bench seat would function as a middle headrest. Additionally, front seat 20 could have three separate airbags which inflate upwardly. A pair of outer airbags extend between the seat and the headrest, as described above while a middle airbag inflates between the two outer airbags to cushion the rearward thrust of the middle front seat passenger.

Figure 20:
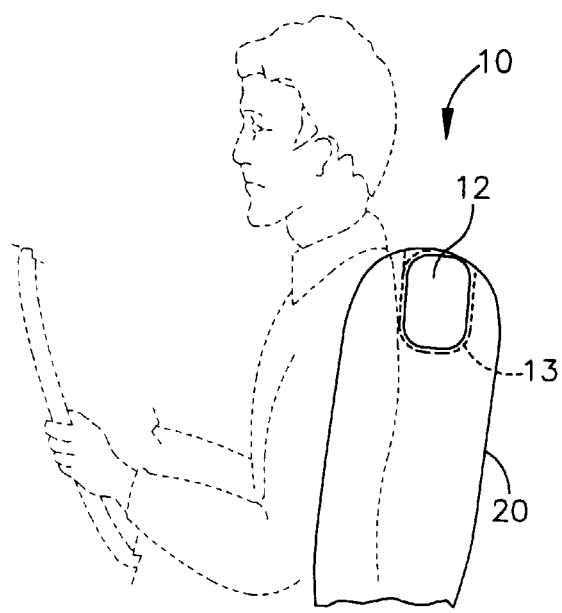
FIG. 20 is a side elevational view of an alternative embodiment of the safety collision headrest system showing the headrest disposed within the backrest of a seat during normal conditions.
Figure 21:
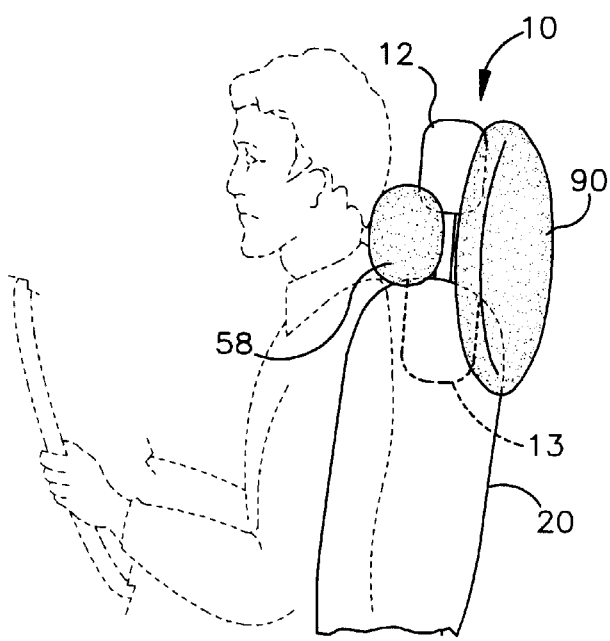
FIG. 21 is a side elevational view of the safety collision headrest system of FIG. 20 immediately after a collision or abrupt stop showing the headrest extended from within the backrest in an upper position and showing front and rear airbags inflated to fill the gap formed between the headrest and the seat.

In a further embodiment shown in FIGS. 20 and 21, headrest 12 is recessed within a chamber 13 of seat backrest 20. FIG. 20 shows headrest 12 in its position within chamber 13 which provides for improved visibility to the driver During a collision, headrest 12 extends upward from within chamber 13 using mechanisms similar to those described previously herein with other embodiments and airbags 58 and 90 (and/or airbag 59) inflate to protect the passengers within the vehicle. In this embodiment, headrest 12 could be replaced with any similar structural element which would provide support for airbags 58, 59 and/or 90.

In an additional embodiment (not shown) of the back seat headrest system described above, airbags 59 of the back seats resemble that of the bench-type seat described previously herein. The right and left back seat airbags 59 each include an inwardly extending extension 82 which fills the area between the right and left back seat headrests to cushion and support the middle back seat passenger.

Figure 18:
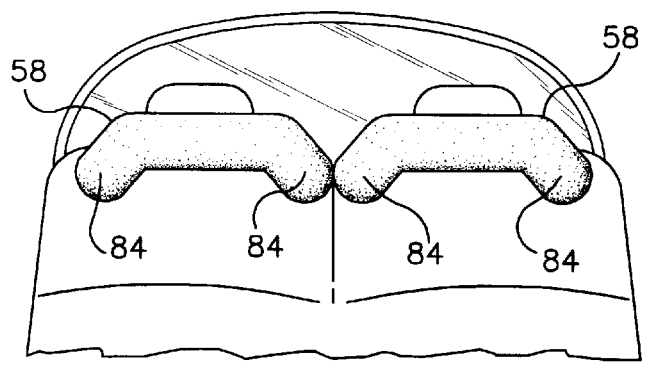
FIG. 18 is a front elevational view of a further embodiments of airbags in the inflated position used to provide additional protection to the head and neck of a vehicle occupant.

Airbags 58 and 59, whether they are used in the front or back seats, may also have a generally U-shaped configuration, as shown in FIG. 18, consisting of curved extensions 84 which cradle the passenger's neck and which guides the passenger's head and neck to a centered position relative to headrest 12. U-shaped airbags 58 and 59 further support the passenger's head and neck to reduce lateral straining of the neck during side-impact collisions.

The headrest system of the present invention may be used on headrests having configurations other than those illustrated herein such as headrests having one center post rather than the pair of poles 14 described above. In this instance, piston rod 64 functions as the center post and is manually adjustable during normal operation of the vehicle. Upon the occurrence of a collision or abrupt stopping headrest 12 is moved upwardly on piston rod 64 and is stopped by a stop plate attached to piston 64 within seat 20 or automatically stops at the piston rod's maximum extension point. The length of piston rod 64 is designed such that headrest 12 is properly positioned behind the passenger's head and neck when piston rod 64 is in the predetermined upper position.

Headrest system 10 can also be installed on high-back bucket or van-type seats. The upper portion of high-back seats are removably attached to the lower portion and loosely sewn or attached using a hook and pile type fabric. Upon impact or a sudden stopping, cylinder 56 fires piston rod 64 which raises the upper portion of the high-back seat to properly position the upper portion of the seat behind the passenger's head and neck. Airbag 58 is stored within the lower portion of the seat and inflates upwardly to cushion the passenger's head and neck as the passenger is thrust rearwardly. The upper portion of the seat is re-attached to the lower portion after use to provide a concealed and aesthetically attractive headrest system.

Accordingly, headrest system 10 provides a pressure actuated cylinder which substantially instantaneously moves headrest 12 from any manually adjusted position to an extended upward position to protect passengers from head and neck injuries during collisions or abrupt stopping. Front airbags 58 and 59 inflate to fill the gap formed between the top of seats 20 and headrests 12 to further cushion the passenger's head and neck as the passenger's head and neck are thrust rearward. Front airbags 58 and 59 are inflated at a position between the passenger and poles 14 and sleeve 66 to prevent the passenger's head and neck from contacting the rigidly mounted support structures. Rear airbag 90 inflates at the rear of seat 20 to prevent back seat passengers from contacting the rear of front seat 20 and the back of poles 14 and sleeve 66.

Accordingly, the safety collision headrest system of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved safety collision headrest system is constructed and used, the characteristics of the construction, and the advantageous, new and useful results obtained; the new and useful structures, devices, elements, arrangements, parts and combinations, are set forth in the appended claims.

What is claimed is:

1. A vehicle safety collision system comprising:
    a seat comprising a seat backrest having a front, a rear and a top;
    a headrest attached to said seat and extendable to an upper position;
    a first airbag which is inflated between said headrest and said seat upon the occurrence of an event;
    fluid pressure actuation means for moving said headrest to the upper position upon occurrence of an event; and
    at least one collision sensor which independently of passenger body movement detects the occurrence of an event and thereafter activates said pressure actuation means, thereby moving said headrest to said upper position.

2. The vehicle safety collision system recited in claim 1 further comprising a rear airbag which is inflated between said headrest and said seat, said rear airbag extending from said rear of said seat backrest.

3. The vehicle safety collision system recited in claim 1, wherein said pressure actuation means includes a cylinder connected to said headrest for moving said headrest to the upper position.

4. The vehicle safety collision system recited in claim 3, wherein said first airbag when inflated is positioned at the front of said seat between said cylinder and a passenger positioned on said seat.

5. The vehicle safety collision system recited in claim 4 further comprising a second airbag which is inflated between said headrest and said seat upon the occurrence of the event.

6. The vehicle safety collision system recited in claim 5 wherein said first and said second airbags are in fluid communication.

7. The vehicle safety collision system recited in claim 5, wherein said second airbag is positioned at the rear of said seat between said cylinder and a passenger position behind said seat.

8. The vehicle safety collision system recited in claim 7, wherein said pressure actuation means includes a combustible propellant which is fluidly connected to said cylinder for supplying fluid to said cylinder for moving said headrest to the upper position.

9. The vehicle safety collision system recited in claim 7, wherein said pressure actuation means includes a pressurized fluid supply which is fluidly connected to said cylinder for supplying pressurized fluid to said cylinder for moving said headrest to the upper position.

10. The vehicle safety collision system recited in claim 5, wherein said pressure actuation means further serves to deploy said first and second airbags.

11. The vehicle safety collision system recited in claim 1, wherein said pressure actuation means further serves to deploy said first airbag.

12. The vehicle safety collision system recited in claim 1, wherein said first airbag has a generally U-shaped configuration which cradles and guides a passenger's head and neck to a centered position relative to said headrest.

13. The vehicle safety collision system recited in claim 1, further comprising a passenger detection sensor embedded within said seat which detects whether said seat is occupied by a passenger and allows actuation of said pressure actuation means during an occurrence of an event if said seat is occupied by a passenger and prohibits actuation of said pressure actuation means during an occurrence if said seat is empty.

14. The vehicle safety collision system recited in claim 13, further comprising a controller operatively coupled to said at least one collision sensor, said passenger detection sensor, and said pressure actuation means, wherein said controller monitors said at least one collision sensor and said passenger detection sensor to thereby selectively control actuation of said pressure actuation means.

15. The vehicle safety collision system of claim 1 wherein said headrest is moved and said airbag is inflated before a passenger seated in said seat is thrust rearwardly.

16. The vehicle safety collision system of claim 1 wherein:
    said seat is a bench front seat capable of seating more than one passenger;
    said system includes a pair of laterally spaced headrests and a pair of first airbags; and
    said first airbags include extensions which extend laterally so as to fill the area between headrests.

17. A vehicle safety collision system recited in claim 1, comprising:
    a plurality of headrests and a first airbag associated with each said headrest,
    wherein activation of said pressure actuation means by said at least one sensor causes essentially simultaneous movement of a plurality of headrests to an upper position and substantially simultaneous deployment of said first airbags.

18. A vehicle safety collision system comprising:
    a plurality of seats, each seat having a backrest with a front surface, a back surface and a top, said plurality of seats comprising a set of first seats and a set of second seats, said second seats located behind either a first or second vehicle seat;
    a plurality of headrests wherein one of said headrests is attached to each of said plurality of seat backrests and extendable to an upper position;
    a plurality of fluid pressure actuation means operatively coupled to each of a plurality of seat backrests for moving said headrest to the upper position upon occurrence of a collision;
    a first airbag operatively disposed within each of said headrests which is inflated between said headrest and said seat backrest upon occurrence of the event;
    a second airbag operatively disposed within each of said headrests which correspond with said first seats of said vehicle and is inflated between said headrest and said seat backrest upon occurrence of the event; and
    at least one sensor which independently of passenger body movement detects the occurrence of the event and thereafter actuates said pressure actuation means and said first and second airbags.

19. The vehicle safety collision system recited in claim 18, further comprising:

a plurality of passenger detection sensors embedded within said seats which detects which of said seats are occupied by a passenger and allows actuation of said corresponding pressure actuation means during an occurrence of an event if said seat is occupied by a passenger and prohibits actuation of said corresponding pressure actuation means during an occurrence if said seat is empty.

20. The vehicle safety collision system recited in claim 19, further comprising:

a controller operatively coupled to said at least one collision sensor, said plurality of passenger detection sensors, and said plurality of pressure actuation means, wherein said controller monitors said at least one collision sensor and said plurality of passenger detection sensors to thereby selectively control actuation of each of said plurality of pressure actuation means.

21. The vehicle safety collision system recited in claim 20, wherein said controller comprises a microprocessor system which receives and processes information in substantially real time from said at least one collision sensor and said plurality of passenger detection sensors to thereby selectively control actuation of each of said plurality of pressure actuation means.

22. A method of providing safety in a vehicle during a collision comprising the steps of:

(a) detecting the occurrence of an event by a vehicle by means independent of passenger body movement;

(b) moving a headrest of a seat of said vehicle to its upper position upon the detection of the event; and (c) inflating an airbag to a position between said headrest and said seat of the vehicle to fill a gap formed between the headrest and the seat.

23. A method recited in claim 22, further comprising, between steps (a) and (b), the steps of:

detecting the presence of a passenger in each said seat of the vehicle; and prohibiting headrest movement and airbag inflation in each seat of the vehicle in which a passenger is not present.

24. A method of providing safety in a vehicle during a collision comprising the steps of:

(a) detecting the occurrence of a collision by a vehicle by means independent of passenger body movement;

(b) detecting the presence of a passenger in each seat of the vehicle;

(c) determining whether each passenger present in the vehicle is greater than a predetermined weight;

(d) selectively moving each headrest of the vehicle that corresponds to a seat in which a passenger greater than a predetermined weight is present to an upper position; and (e) inflating an airbag between each headrest and seat of the vehicle that corresponds to a seat in which a passenger greater than a predetermined weight is present to fill a gap formed between each headrest and seat to protect the head and neck of each passenger of the vehicle during the collision.

25. A vehicle safety collision system comprising:

a seat comprising a seat backrest having a front, a rear and a top; and first and second airbags stored within the top of said seat backrest;

wherein said first and second airbags are front and rear airbags, respectively, said front airbag extending forwardly from said seat backrest when inflated and said rear airbag extending rearwardly from said seat backrest when inflated; and wherein further said first and second are inflated from said top of said backrest upon the occurrence of an event; and wherein said front and rear airbags are linked by a fluid connection to form a single air bag structure.

* * * * *